United States Patent
King

(10) Patent No.: US 11,338,304 B2
(45) Date of Patent: *May 24, 2022

(54) FLUID SEPARATOR DEVICE

(71) Applicant: Kort Industries, LLC, San Leon, TX (US)

(72) Inventor: George R. King, The Woodlands, TX (US)

(73) Assignee: Kort Industries, LLC, San Leon, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,736

(22) Filed: Feb. 12, 2020

(65) Prior Publication Data

US 2020/0179954 A1    Jun. 11, 2020

Related U.S. Application Data

(63) Continuation of application No. 15/488,214, filed on Apr. 14, 2017, now Pat. No. 10,596,580.

(Continued)

(51) Int. Cl.
| | |
|---|---|
| *B01D 24/00* | (2006.01) |
| *B04C 9/00* | (2006.01) |
| *C02F 1/38* | (2006.01) |
| *B01D 21/01* | (2006.01) |
| *B01D 21/26* | (2006.01) |

(Continued)

(52) U.S. Cl.
CPC ............... *B04C 9/00* (2013.01); *B01D 21/01* (2013.01); *B01D 21/267* (2013.01); *B04C 5/081* (2013.01); *B04C 5/103* (2013.01); *B04C 5/16* (2013.01); *C02F 1/385* (2013.01); *B04C 2009/008* (2013.01); *C02F 1/52* (2013.01); *C02F 2103/10* (2013.01); *C02F 2103/365* (2013.01); *E21B 21/065* (2013.01)

(58) Field of Classification Search
CPC ...... B01D 21/01; B01D 21/267; B04C 5/081; B04C 5/105; B04C 5/16; B04C 9/00; B04C 2009/008; C02F 1/385; C02F 1/52; C02F 2103/10; C02F 2103/365; E21B 21/065

See application file for complete search history.

(56) References Cited

U.S. PATENT DOCUMENTS

| | | | |
|---|---|---|---|
| 3,425,545 A | 2/1969 | Zemanek et al. | |
| 3,568,847 A | 3/1971 | Carr | |

(Continued)

FOREIGN PATENT DOCUMENTS

EP        0046049 A1    2/1982

*Primary Examiner* — Dung H Bui
(74) *Attorney, Agent, or Firm* — Egbert, McDaniel & Swartz, PLLC

(57) ABSTRACT

A device for separating and extracting suspended solids and particles from a fluid is shown. The device can include a hydro-cyclonic process unit, a variable geometry vortex process unit, a reverse coalescence and flocculation process unit and a fixed geometry vortices separator process unit. The fluid to be treated can enter the device through a fluid inlet and travel and recirculate through the several process units. The process units can collectively induce vorticose separation of the fluid and separate suspended solids and particles within the fluid. The suspended solids and particles can then be extracted from the device via one or more extraction fluid outlets. After the desired amount of suspended solids and particles has been removed, the processed fluid can be discharged from the device.

20 Claims, 6 Drawing Sheets

Related U.S. Application Data

(60) Provisional application No. 62/323,359, filed on Apr. 15, 2016.

(51) Int. Cl.
    *B04C 5/16*       (2006.01)
    *B04C 5/081*     (2006.01)
    *B04C 5/103*     (2006.01)
    C02F 103/10    (2006.01)
    E21B 21/06     (2006.01)
    C02F 103/36    (2006.01)
    C02F 1/52      (2006.01)

(56) References Cited

U.S. PATENT DOCUMENTS

| | | |
|---|---|---|
| 3,698,555 A | 10/1972 | Conner |
| 4,226,708 A | 10/1980 | McCartney |
| 4,414,112 A | 11/1983 | Simpson et al. |
| 5,004,552 A | 4/1991 | Al-Yazdi |
| 5,131,544 A | 7/1992 | Serres et al. |
| 6,190,543 B1 | 2/2001 | Christiansen |
| 7,651,614 B2 | 1/2010 | Kelsey et al. |
| 8,202,352 B2 | 6/2012 | Hu et al. |
| 8,337,603 B2 | 12/2012 | Akhras et al. |
| 8,584,706 B2 | 11/2013 | Oversen et al. |
| 8,622,225 B2 | 1/2014 | Goninan |
| 8,828,224 B2 | 9/2014 | Jiang et al. |
| 8,875,903 B2 | 11/2014 | Lean et al. |
| 9,370,753 B2 | 6/2016 | Paxton |
| 2006/0163153 A1 | 7/2006 | Caldelman |
| 2014/0367348 A1 | 12/2014 | Volkel et al. |

FLUID SEPARATOR DEVICE

CROSS-REFERENCE TO RELATED CASES

This application is a continuation of co-pending U.S. patent application Ser. No. 15/488,214, filed Apr. 14, 2017, which claims priority to U.S. Provisional Patent Application Ser. No. 62/323,359, filed on Apr. 15, 2016, to George R. King, entitled "Fluid Separator Device," the entire disclosures of which is incorporated herein by reference.

FIELD OF THE INVENTION

The present invention relates generally to a device and process for removing particulates and suspended solids from aqueous fluids.

BACKGROUND OF THE INVENTION

Fluid separator devices are commonly used in the water well drilling industry, where the maintenance of the drilling fluids as to solids control and dewatering operations historically requires extensive mechanical processes that are costly to operate and maintain. Regulatory agencies, especially environmentally focused agencies, are establishing stricter standards regarding fluid disposal and drilling contractors are trying to reduce the cost of drilling fluid disposal by reducing the amount of water that is disposed along with the cuttings and spent clays used in the drilling fluids. Accordingly, a need exists for a better, more efficient and more economical device and process for the selective removal of particulates and suspended solids associated with aqueous-based fluids.

SUMMARY OF THE INVENTION

The present invention is directed generally to a device and process for fluid treatment. The device and associated in-situ process of vorticose separation can provide an economical solution for effective solids control and reuse potential of water contained in drilling fluids and other treatable fluids. As a result, the combination of the device and process can provide a significant reduction in the transport and disposal of fluids associated with drilling operations.

The device can be configured as a hydro-cyclonic, reverse coalescence, vorticose separator ("HRCV") device and can include a plurality of different process units in order to effectively and efficiently separate and remove suspended solids and particles from an unprocessed fluid. The fluid can be introduced into the device via a fluid inlet nozzle or pipe, then processed via one or more processing units, and a component of the fluid containing solids and particles can be removed from the device via one or more extraction outlet nozzles or openings. The remaining processed fluid can then be removed from the device after the desired amount of particles and suspended solids have been removed from the fluid. The device and associated process functions according to one embodiment of the present invention can include each of the following components: (i) a hydro-cyclone process unit for accelerating the fluid to a desired separation speed after the fluid enters the device, essentially functioning as an emulsifier; (ii) a variable geometry vortex process unit for inducing a directional change in the fluid for purposes of mechanical shearing; (iii) a reverse coalescence and flocculation process unit for pulling colloidal structures in the fluid out of suspension for formation into defined floc or flake; and (iv) a fixed geometry vortices process separator unit for inducing vorticose separation of the fluid and removing the suspended solids, floc, flake and other particles present in the fluid.

Other aspects and advantages of the present invention will be apparent from the following detailed description of the preferred embodiments of the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
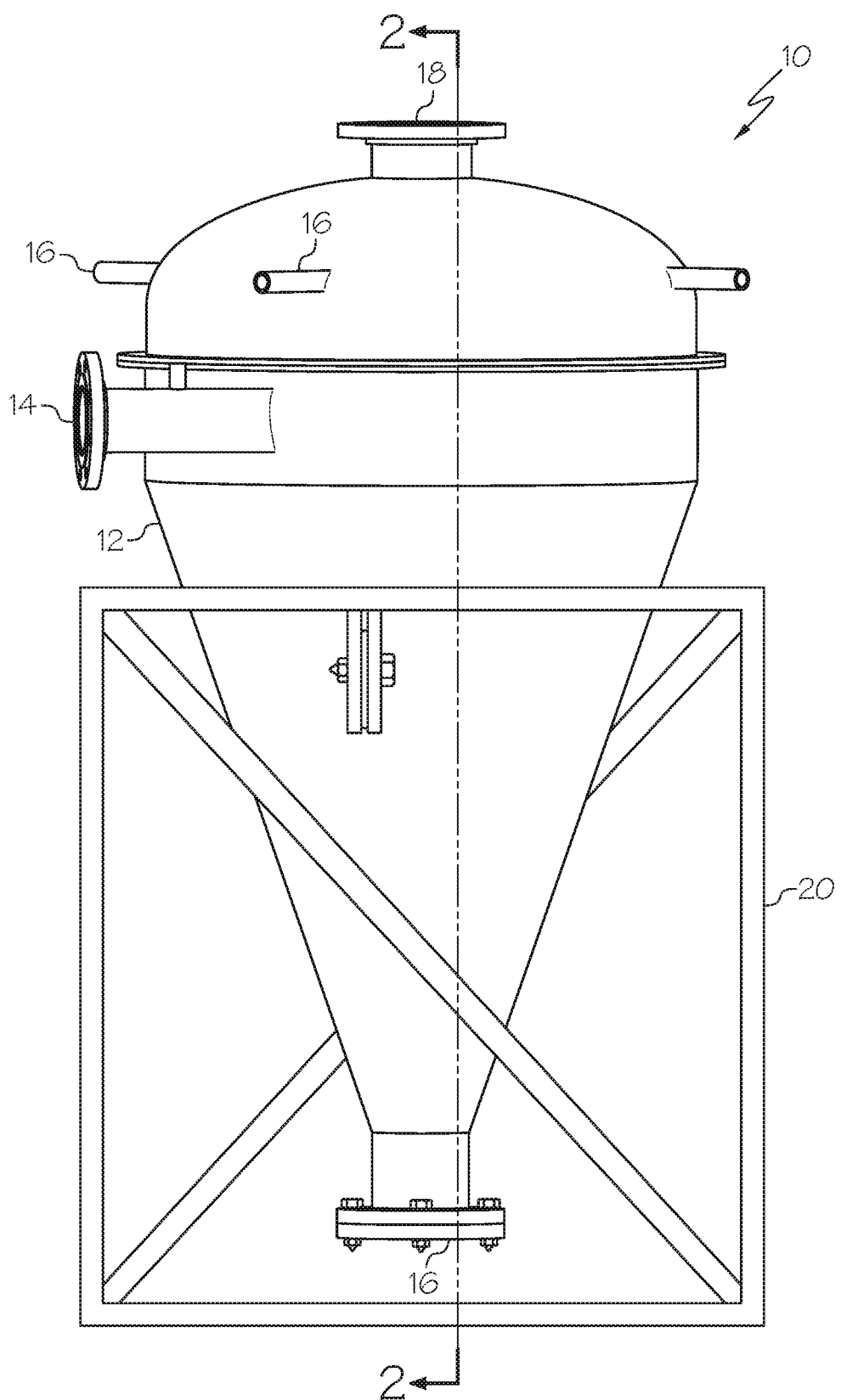
FIG. 1 is a side elevation view of a fluid separator device in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

The present invention is directed generally to a fluid separator device 10 and fluid separation process 100 as illustrated in the various figures. Particularly, fluid separator device 10 and process 100 can be used to remove particulates and suspended solids contained in an aqueous fluid.

Device 10 can be advantageously used in the field of water well drilling in order to reduce the amount of water disposed of while drilling and can be used in waste water treatment applications where suspended solids need to be quickly and efficiently removed from a fluid. Several other alternative applications are possible in alternative embodiments of the present invention.

According to one embodiment of the present invention, device 10 can be configured as a hydro-cyclonic, reverse coalescence, vorticose ("HRCV") separator device that can combine the effect of mechanical extraction, centrifugal separation, flocculation and vortex separation into a contiguous in-situ process. In such an embodiment, device 10 can provide an efficient and reliable solids control that is transportable, simple to operate and maintain, and can provide a substantial reduction in capital cost and operating expense.

Device 10 and process 100 operate at least partially based on the physical laws relating to angular momentum conversion. In a system free of external torque, the total angular momentum of the system remains constant irrespective of transformations and interactions occurring within the system. This principle applies to complex systems, such as rotating fluid systems. In such systems, if the radius of a vessel that contains a body of spinning fluid decreases, then the body of the fluid must spin faster in order to conserve angular momentum. Conversely, if the radius of a vessel that contains a body of spinning fluid increases, then the body of the fluid must spin slower. Device 10 and process 100 can incorporate this principle in establishing how the density of a solid will dictate its spatial placement in a body of spinning fluid in order to cause separation of suspended solids or particles when those solids or particles are encapsulated in an aqueous fluid.

Turning to FIG. 1, fluid separator device 10 can include an exterior shell or tank 12 with a fluid inlet 14 and one or more extraction fluid outlets 16. Device 10 can additionally include an overflow fluid outlet 18 for removing excess fluid from device 10 according to one embodiment of the present invention. Tank 12 can be constructed from any suitable material and can be constructed from one or more individual components or parts depending on the particular embodiment of the present invention. Inside of tank 12 can be one or more different process units, including process units 22, 24, 34 and 36 described in greater detail below, that can be configured for processing the fluid entering through fluid inlet 14. Depending on the particular embodiment, it is also recognized one or more of the process units of device 10 can be located all or partially outside of tank 12. For example, one or more of the process units can be configured to be externally connected to tank 12 for ease of transport and storage.

Device 10 can be configured for receiving unprocessed fluid through fluid inlet 14. After the unprocessed fluid enters device 10, the fluid can pass through the processing units 22, 24, 34 and 36 and a component of the fluid containing suspended solids and particles can exit through the one or more extraction fluid outlets 16. Once the desired amount of suspended solids and particles have been removed from the fluid contained within device 10, which can be determined by the density of the fluid, the remaining processed fluid can be removed from device 10. While flowing through device 10, the suspended solids and particulates can be coalesced, separated and extracted from the fluid throughout a series of process functions or steps as described in greater detail below. The component of the fluid containing the suspended solids and particulates can then be removed from device 10 via extraction fluid outlets 16 and the remaining "processed" component of the fluid can then exit device 10. The processed component of the fluid can be removed from device 10 after the desired level of suspended solids and particulates have been removed through the process steps performed by device 10.

As illustrated in FIG. 1, device 10 (and tank 12) can further be configured for use with a support frame and/or process skid 20. Skid 20 can include and/or house various pumps, piping and required storage for providing the ability to selectively remove an aqueous fluid from drilling fluids or other applications where water and/or other fluids need to be separated, cleaned or otherwise treated.

Figure 2:
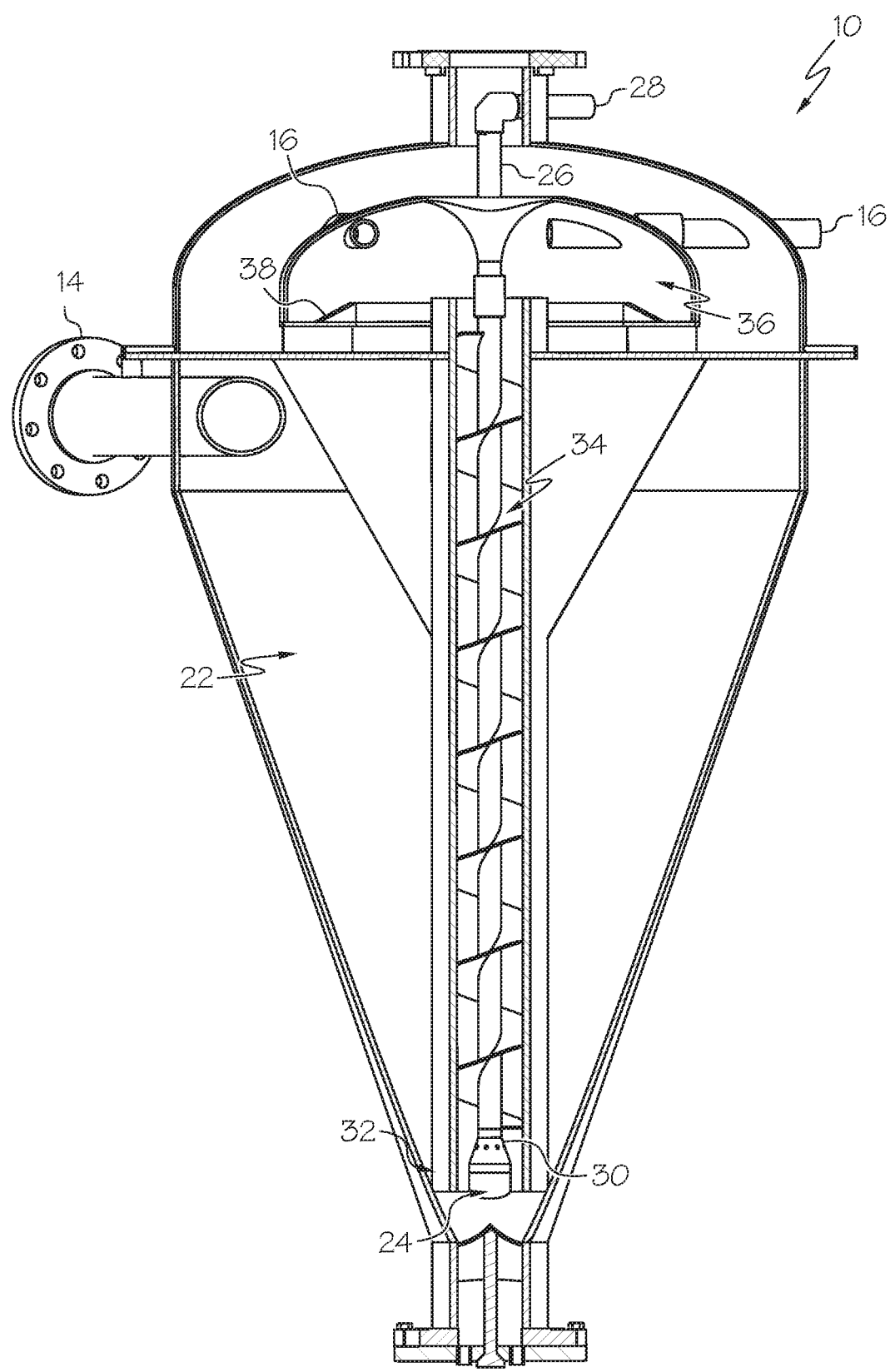
FIG. 2 is a side elevation section view of the fluid separator device of FIG. 1 illustrating an interior of the fluid separator device in accordance with one embodiment of the present invention.

FIG. 2 illustrates a section view of device 10 showing the individual processing units 22, 24, 34 and 36 according to one embodiment of the present invention. Each processing unit 22, 24, 34 and 36 can be configured for performing specific process functions that collectively make up fluid separation process 100. Device 10 and collectively processing units 22, 24, 34 and 36 can be used in conjunction with fluid separation process 100, including individual process functions 102-112 shown in FIG. 7 and described in greater detail below according to one embodiment of the present invention.

As shown in FIG. 2, device 10 can include a first processing unit 22. According to one embodiment of the present invention, first processing unit 22 can be configured as a hydro-cyclone process unit ("HPU") and can receive the unprocessed fluid entering device 10 through fluid inlet 14. HPU 22 can additionally be configured to receive recirculating fluid already contained in device 10 as described in greater detail below. HPU 22 can have a cyclonic shape and structure with partially angled sides designed for urging the fluid entering HPU 22 into a downward flow direction. Fluid inlet 14 can also be configured relative to HPU 22 so that the fluid travels through HPU 22 in a clockwise direction; however, it is recognized that HPU can be configured for a counter-clockwise flow direction in alternative embodiments. The cyclonic configuration of HPU 22 can force the incoming fluid to accelerate in the desired downward flow pattern in order to begin the separation process. This can be accomplished by configuring HPU 22 to allow the fluid to reach a desired separation velocity and essentially function as an emulsifier.

As further shown in FIG. 2, device 10 can include a second processing unit 24 in fluid communication with HPU 22. According to one embodiment, second processing unit 24 can be configured as a variable geometry vortex process unit ("VVU") and can receive the fluid as it exits HPU 22. VVU 24 can be configured to force a rapid change in direction of the accelerated fluid as the fluid enters a variable volute 32. According to one embodiment, VVU 24 can be configured to create an approximate one-hundred eighty (180) degree turn of the fluid as it enters variable volute 32. As described in greater detail below, VVU 24 can have an adjustable geometry that can selectively adjust the volume of VVU 24 (and entrance to variable volute 32) in order to conserve process efficiency as the fluid travels through VVU 24. The rapid change in direction of the fluid caused by VVU 24 can cause mechanical shearing of the fluid to begin the process of separating suspended solids and particles in the fluid. As the mechanically sheared fluid progresses through VVU 24, clays and associated colloidal structures dispersed within the fluid can begin to be coalesced.

As further shown in FIG. 2, device 10 can include a third processing unit 34 in fluid communication with VVU 24. According to one embodiment, third processing unit 34 can be configured as a reverse coalescence and flocculation process unit ("RCFU") defined at least partially within variable volute 32 and can receive the fluid as it exits VVU 24. RCFU 34 can be configured as a spiraled auger extending at least partially into variable volute 32 and can alter the density of the fluid and the phases of the fluid as it travels through RCFU 34. The rapid change in direction and reversal in direction caused by VVU 24 can begin a reverse coalescence process as the fluid travels into variable volute 32 and into RCFU 34. Within RCFU 34 can be a gas tube 26 having an inlet 28 located outside of tank 12 for receiving a compressed gas/air from an exterior source and one or more outlets 30 located at variable volute 32 and the entrance of RCFU 34. Outlets 30 can be configured to release and inject the gas or air into the fluid as it enters RCFU 34. The density change that occurs inside RCFU 34 can be a by-product of the injected gas occurring at RCFU 34, which can assist in the separation process as described in greater detail below. In conjunction with the injected gas/air, a coagulant material and/or clarifying agent normally associated with a conventional flocculation process can be injected with the through outlet 30. The gas bubbles produced by the injection of compressed gas can create additional surface area, which can result in and extend the efficiency. This can further allow for a less amount of coagulant material/clarifying agent to be used for effective flocculation. As a result, RCFU 34 can provide an environment, wherein colloids can come out of suspension in the fluid in the form of a defined floc or fluke, which can be aided by the addition of the coagulant material and/or a clarifying agent. The complete function and operation of RCFU 34 and VVU 24 are described in greater detail below.

As further shown in FIG. 2, device 10 can include a fourth processing unit 36 in fluid communication with RCFU 34. According to one embodiment, fourth processing unit 36 can be configured as a fixed geometry vortices process unit separator ("FVU") suitable for inducing vorticose separation within the fluid after exiting RCFU 34. FVU 36 can be configured as a chamber having a fixed geometry with a defined boundary necessary to produce the induced vorticose separation. Due to the configuration of RCFU 34 and FVU 36, the fluid exiting RCFU 34 and into FVU 36 can travel as a spinning fluid in the form of a vortex. Within the chamber of FVU 36 can be an internal backpressure ring 38 that can create and/or maintain the shape and orientation of the spinning fluid inside FVU 36. As the fluid spins within FVU 36, denser particles and fluid (the solids component of the fluid) can move toward the outer part of the spinning fluid or vortex and can exit through one or more extraction fluid outlets 16 strategically positioned along the exterior of FVU 36 as described in greater detail below.

Figure 3:
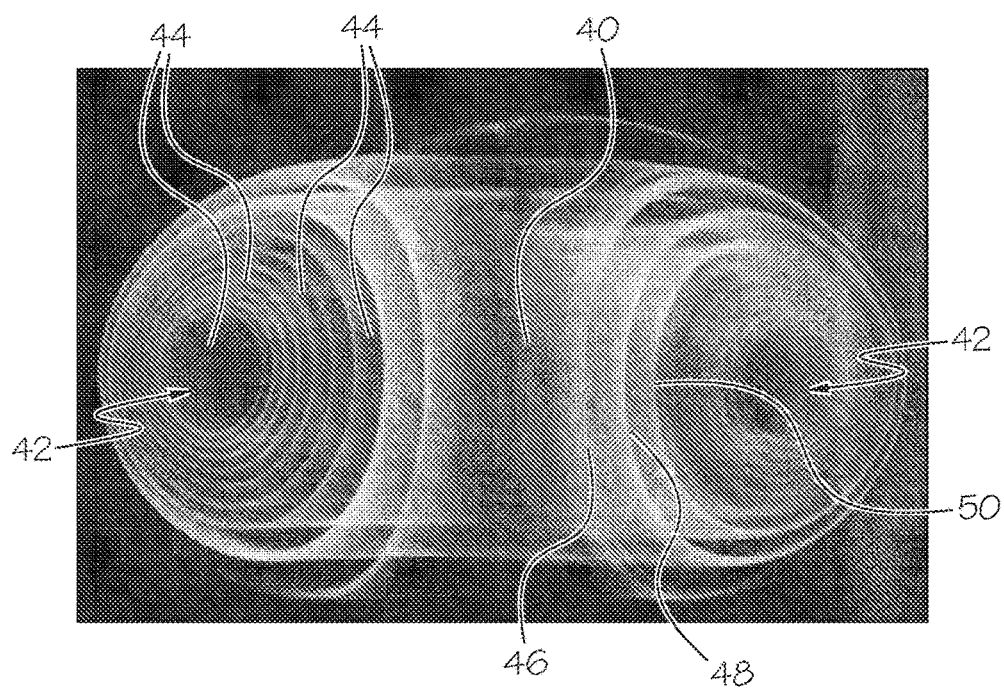
FIG. 3 is a schematic representation of zones of colloidal structures produced within a, and extracted by, a fluid separator device in accordance with one embodiment of the present invention.

Turning now to FIG. 3, the particle separation from the fluid that occurs in device 10 (and processing units 22, 24, 34 and 36) will be described in greater detail. Device 10 can create induced vorticose of the fluid as it travels through HPU 22, VVU 24, RCFU 34 and finally FVU 36. The induced vorticose within FVU 36 of the fluid can result in the production of colloidal structures within the fluid as it travels through RCFU 34. FIG. 3 illustrates a schematic illustration showing the theoretical placement of different zones of colloidal structures produced within the fluid by device 10 and RCFU 34 and separated in FVU 36. As shown, three primary zones 40, 42 and 44 can be defined. Zone 40 can define a first primary zone and the vertical core of a vortex separator. The geometry together with the flow rate, fluid density and flocculation efficiency can define a cut point zone 46 of a first phase of separation. Cut point zone 46 can represent the particle size that will be removed from the fluid stream with approximately fifty percent (50%) efficiency. It is also recognized that other efficiency levels greater or less than 50% can be used in alternative embodiments. Particles larger than the cut point zone 46 establish an outer zone 48 of the vertical core vortex. Particles located in the outer zone 48 can be removed with greater efficiency. Particles smaller than the cut point zone 46 are located in an inner zone 50 and can be removed with a lower efficiency. Outer zone 48, cut point zone 46 and inner zone 50 function as zones of separation.

The second primary zone, zone 42 can be defined as the inner core of the horizontal vortex as illustrated in FIG. 3. The inner core can spin in a counter-clockwise rotation perpendicular to the axis of the vertical inner core associated with zone 40. One primary function of the inner core is to compress the zones that establish and define the cut point zone 46. This compression can be accomplished by centrifugal reaction and can improve the overall process efficiency. A buoyant force component can also be defined in an inward radial direction, opposite to the particle's centrifugal force because it is one a volume of fluid that has fewer particles per given volume as compared to the surrounding fluid, which can be based on the efficiencies defined by zones of separation 46, 48 and 50.

The third primary zone, zone 44 can incorporate one or more zones of extraction. The buoyant force component can provide the parcel and spatial separation between each of the zones of extraction. Heavy particles can be located in an outer parcel and the cleanest fluid can be located in an inner parcel. This is at least partially based on the relationship between density and motion within a vortex, such as the induced vorticose created within fluid traveling through device 10 and FVU 36. If the density of the fluid is less than the density of a particle in the fluid, then the motion of the fluid in the vortex is negative (−) and toward the center of rotation. If the density of the particle in the fluid is greater than the fluid, then the motion of the particle is positive (+) and away from the center of rotation. Collectively, this can facilitate the separation process occurring within device 10 where the solids component of the fluid is separated from the processed fluid component of the fluid in FVU 36.

The overall efficiency of the separation process occurring within device 10 can be affected by the fixed geometry of FVU 36. The placement of extraction fluid outlets 16 and their associated valves and piping can also be critical to the efficiency of the extraction process. As illustrated in the figures, FVU 36 can include four extraction fluid outlets 16 with selectively adjustable or variable shutoff valves; however, it is recognized that more than four or fewer than four outlets 16 and associated valves can be used in alternative embodiments of the present invention. When the fluid is first introduced into device 10, each valve within the four outlets 16 can be in an open position and the variable geometry of VVU 24 can be set at the minimum opening dimension as described in greater detail below. As the fluid begins to decrease in density as it travels through device 10 (as a result of the extraction process occurring in FVU 36 and described above with reference to FIG. 3), one or more of the valves of outlets 16 can be adjusted to reduce the opening size of outlets 16 and eventually close outlets 16. As outlets 16 are being adjusted, the variable geometry of VVU 24 can be increased to improve the efficiency of device 10. According to the embodiment illustrated in the figures, one valve of an outlet 16 is closed and the variable geometry of VVU 24 is increased approximately 0.5 inches for each fifteen percent (15%) reduction in the fluid density of the fluid traveling through device 10.

Figure 4:
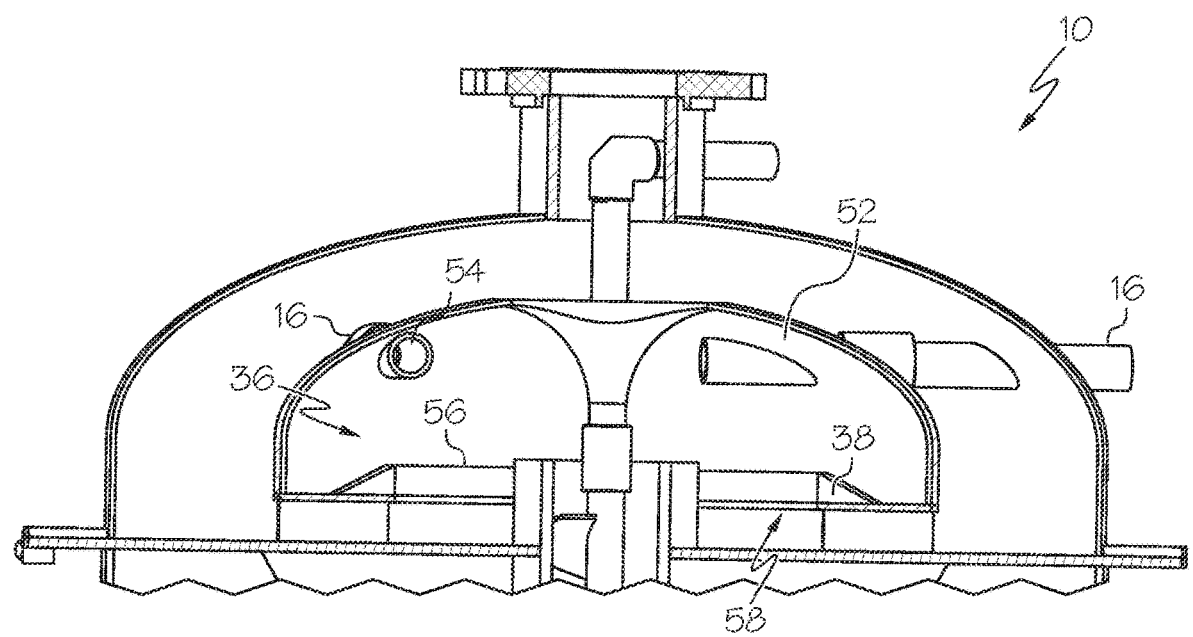
FIG. 4 is a partial side elevation section view of the fluid separator device of FIG. 1 illustrating a fixed geometry vortices process separator unit in accordance with one embodiment of the present invention.

Turning now to FIG. 4, FVU 36 according to one embodiment of the present invention will be described in greater detail. FVU 36 can incorporate a continuous, in-situ process for separating suspended solids and particles from the fluid in device 10 and extracting from device 10 the solids component of the fluid containing such suspended solids and particles in the form of floc or flake or other colloidal structures. This process can also improve the recovery efficiency of device 10 by reprocessing the recirculated, bypassed fluid traveling through device 10 as described herein. FIG. 4 illustrates a section view of FVU 36 to show the fixed geometry that can create the induced vorticose separation in FVU 36 through the formation of the first two primary zones, vertical zone 40 and horizontal zone 42, and the third primary zones of extraction 44 for heavy particles or fluid (as described above with reference to FIG. 3). FVU 36 can include one or more points of extraction 54 that can be precisely located along an inner wall 52 of FVU 36 to allow the withdrawal of the heaviest particles layered in the swirling action of the horizontally-orientated vorticose fluid in FVU 36. The energy created by the centrifugal action compresses the particles out of the fluid vortex and toward the inner wall 52 of FVU 36. Extraction points 54, which can be positioned at and connected to extraction fluid outlets 16 as shown in FIG. 4, can be strategically positioned on inner wall 52 of FVU 36 to allow for efficient removal of the solids component of the fluid containing suspended solids and particles from the fluid in FVU 36. The locations of extraction points 54 can be critical to the efficient removal of the particles included in cut point zone 46 (as illustrated in FIG. 3) of the fluid in FVU 36. According to one embodiment of the present invention, each extraction point 54 is located tangentially to the radial flow of the fluid in FVU 36 and at the point of minimum reduction in angular momentum.

As shown in FIG. 4, FVU 36 can include a back pressure ring 38 offset slightly inward from wall 52 and extending upward at an angle toward the interior of FVU 36. Back pressure ring 38 can include a wicker bill 56 as also shown in FIG. 4. The placement of back pressure ring 38 and wicker bill 56 can influence the tangent point of radial flow of the fluid in FVU 36 and the point of minimum reduction in angular momentum. As a result, the location of back pressure ring 38 and wicker bill 56 can be selected based on the desired position of extraction points 54. The wake produced off the trailing edge of wicker bill 56 can produce a pair of counter-rotating vortices in the fluid that can increase the pressure above wicker bill 56 and decrease the pressure below wicker bill 56. The pressure variation created by wicker bill 56 can assist in keeping the boundary layer flow of the fluid attached all the way to the end of the trailing edge of wicker bill 56. This can further compress the particles located in extraction zone 44 of the fluid moving in FVU 36.

As the fluid spins inside FVU 36 it can form a vortex which can enable the vorticose separation of the fluid. The denser/heavier portions of the fluid (e.g., colloidal structures, floc and other particles and suspended solids) migrate toward the outer portion of the fluid vortex while the cleaner or processed portions of the fluid migrate toward the interior of the fluid vortex based on the principles of fluid mechanics and density as described above. As also illustrated in FIG. 4, FVU 36 can include a by-pass orifice 58 positioned near the bottom region of FVU 36 that can set the recovery efficiency of FVU 36 and device 10. By-pass orifice 58 can allow the fluid traveling within FVU 36 and not extracted through extraction outlets 16 to recirculate to HPU 22 for additional processing by units 22, 24, 34 and 36.

Figure 5:
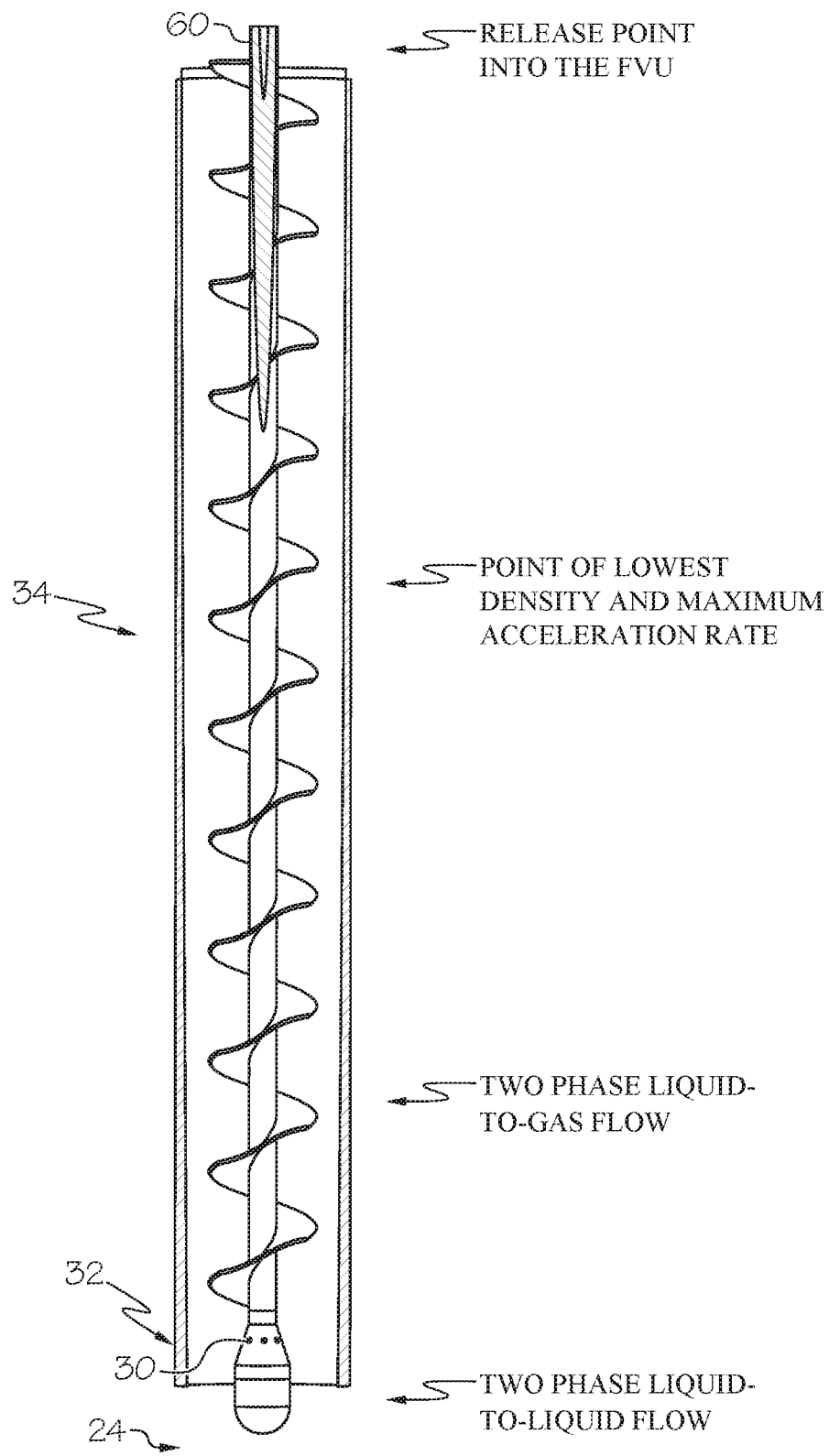
FIG. 5 is a partial side elevation section view of the fluid separator device of FIG. 1 illustrating a reverse coalescence and flocculation process unit in accordance with one embodiment of the present invention.

Turning now to FIG. 5, RCFU 34 according to one embodiment of the present invention will be described in greater detail. As illustrated in FIG. 5, RCFU 34 can be positioned at least partially within variable volute 32 and can be configured, at least partially with a spiral auger structure having a compressed air/gas tube 26 extending vertically therethrough. At the entrance of RCFU 34 can be compressed air/gas outlet 30, which can inject air/gas into the passing fluid as it leaves VVU 24 and enters RCFU 34. The rapid change in direction of the fluid caused by VVU 24 and continued by variable volute 32 can create mechanically sheared fluid that passes the point of air/gas injection at the entrance of RCFU 34. As the fluid traveling through device 10 passes through HPU 22, clays and associated colloidal structures (or particles) can begin to reform as an emulsion. With the density loss due to partial separation of the fluid in HPU 22, the lighter (less dense) fluid can be coalesced as the fluid accelerates through VVU 24. The rapid change in direction, caused by VVU 24, in addition to the centrifugal forces, can allow the fluid to begin a liquid-to-liquid phase transfer as the fluid comes out of a coalescenced state and enters RCFU 34 as illustrated in FIG. 5. As air/gas is injected to the fluid by outlets 30, the fluid entering RCFU 34 can undergo a change in density.

At a liquid-to-gas phase interface (as also illustrated in FIG. 5), the surface tension of the fluid can increase as a result of the greater attraction of liquid molecules to each other (a result of cohesion) in comparison to the liquid molecules' attraction to molecules in the air/gas (a result of adhesion). The net effect can be an inward force at the fluid's surface that can cause the fluid to behave as if its surface were covered with a stretched elastic membrane. This surface tension can be strong enough to impede and even block the reverse coalescence process. In order to assist in breaking the surface tension of the fluid, a coagulation material and/or clarifier agent can be injected with the compressed gas according to one embodiment of the present invention, which can reduce the surface tension of the fluid by a factor of three or more. This process can facilitate RCFU 34 in converting the fluid in device 10 from a two phase liquid-to-liquid flow to a two phase liquid-to-gas flow as shown in FIG. 5. The conversion process from liquid-to-liquid to liquid-to-gas can accelerate the change to an emulsified fluid being transported by a gaseous carrier. The gas bubbles within the fluid can have very large surface areas with very little mass and the added coagulation/clarifying agent can bind to the entrained bubbles to provide a slip plane that can transport the emulsified colloidal structures. The mechanics to this slip plane transport phenomenon can be defined by the Gibbs-Marangoni Hypotheses, which state that mass transfer along an interface between two fluids is due to the change in surface tension gradient.

RCFU 34 can provide an environment where colloidal structures (or particles evenly distributed through the fluid traveling through device 10) can come out of suspension in the form of defined floc or flake, at least partially due to the addition of the coagulation and/or clarifying agent injected with the air/gas from outlet 30. This can allow for a conventional process of centrifugal separation of an emulsified solution to occur within device 10 on the fluid at a dramatically higher level of efficiency. The efficiency increase can be related to the physical science whereby tiny fragments of colloidal material spontaneously assemble into much larger masses due to the flocculation that can occur along slip plains in the two-phase flow in RCFU 34. The larger masses of floc can then be transported by surface tension gradients over the additional surface area provided by the gas bubbles in the fluid to a release point 60 where the fluid and floc enter FVU 36 as illustrated in FIG. 5.

Figure 6:
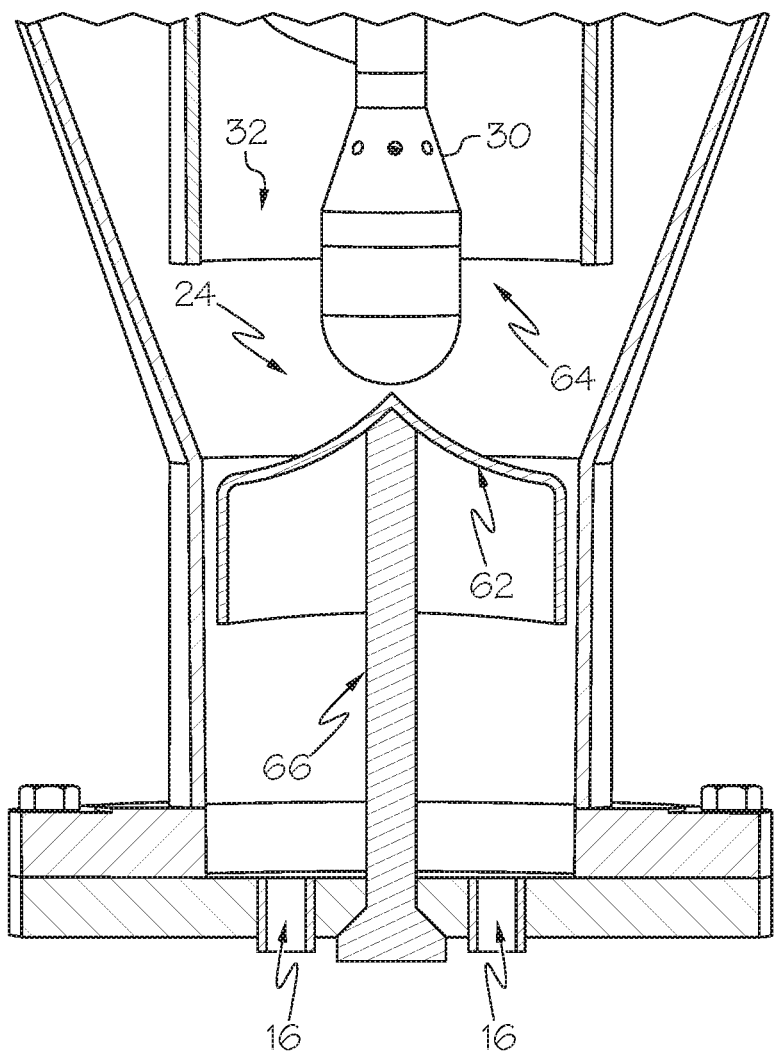
FIG. 6 is a partial side elevation section view of the fluid separator device of FIG. 1 illustrating a variable geometry vortex process unit in accordance with one embodiment of the present invention.

Turning now to FIG. 6, VVU 24 according to one embodiment of the present invention will be described in greater detail. As illustrated in FIG. 6, VVU 24 can include an adjustable contour 62 that can provide for a variable distance (and geometry) between an entrance 64 to RCFU 34. Adjustable contour 62 can be lifted and lowered by means of an adjustment screw 66 as shown in FIG. 6. Conventional forward flowing hydro-cyclone devices remove particles that are denser than surrounding fluid. The addition of a variable geometry vortex (such as VVU 24) enhances the ability of HPU 22 to remove particles from the fluid as the density of the fluid changes. As the fluid becomes lighter (less dense), the distance between adjustable contour 62 and entrance 64 to RCFU 34 becomes wider. This adjustment can be manually performed or automatically performed depending on the particular embodiment of device 10. In addition, according to one embodiment, adjustable contour 62 can be lifted by turning adjustable screw 66 in a clockwise direction. As adjustable contour 62 is lifted, the height of VVU 24 can be increased (i.e., the distance between adjustable contour 62 and the entrance of RCFU 34). Similarly, as adjustable contour 62 is lowered, the height of VVU 24 can be reduced. Once the fluid sufficiently recirculates through device 10 and reaches a specified micron range (e.g., 20 micron range), adjustable contour 62 can be placed in a shut-off position (i.e., back seated in the shut-off position). This can have the effect of forcing all the fluid in device 10 through RCFU 34 and eventually FVU 36.

Figure 7:
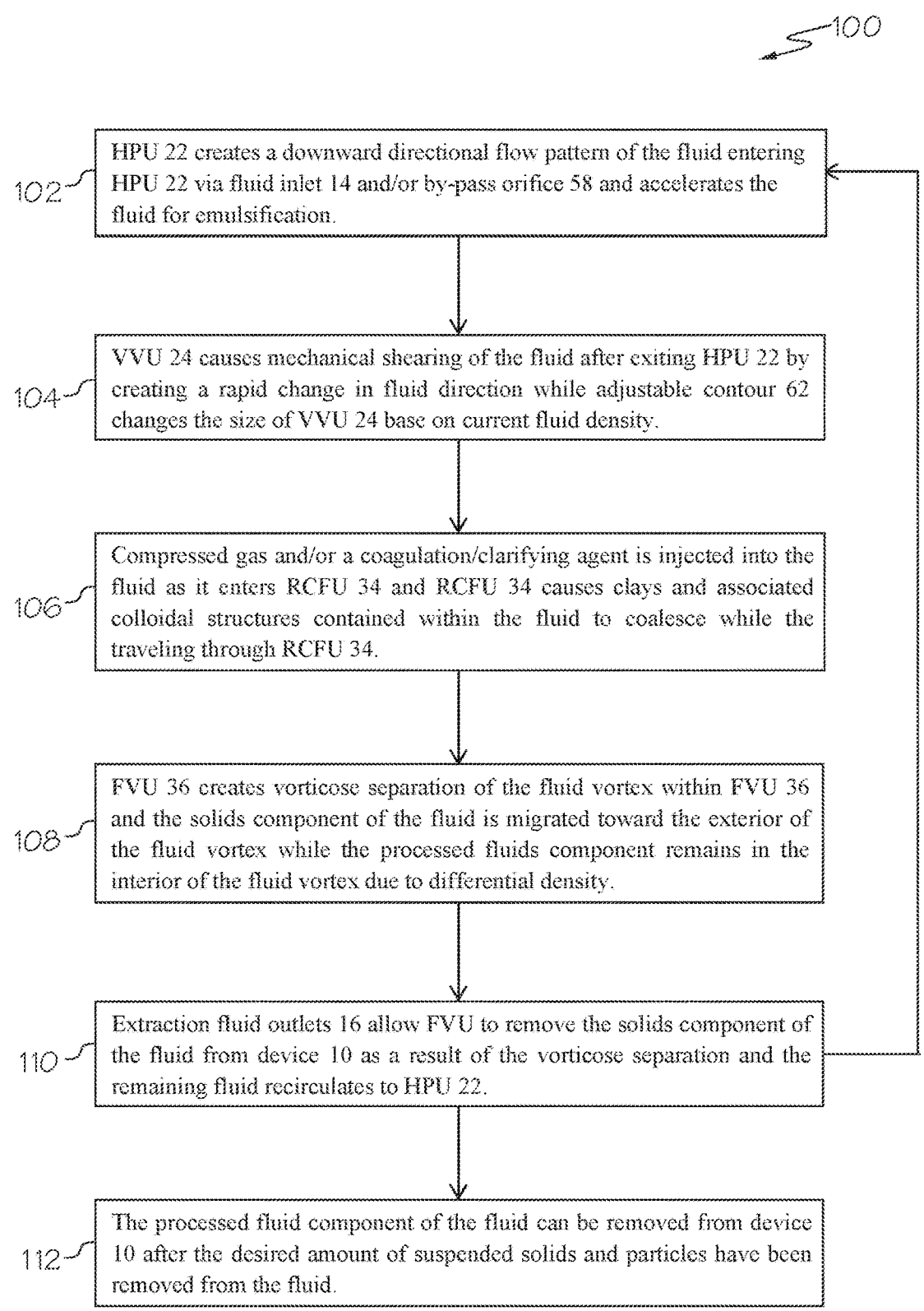
FIG. 7 is a flow diagram illustrating a fluid separation process carried out by a fluid separator device in accordance with one embodiment of the present invention.

FIG. 7 illustrates a flow diagram showing the functional steps of the selective fluid separation process 100 performed by device 10 and the several processing units 22, 24, 34 and 36 contained therein. As illustrated in FIG. 7, process 100 begins at process function 102 where an unprocessed fluid enters device 10 and into HPU 22 through fluid inlet 14. At this same time, recirculating fluid from FVU 36 can enter HPU 22 via by-pass orifice 58. During process function 102, HPU 22 can allow the fluid to begin a downward clockwise directional flow path as the fluid's velocity is accelerated, which can result in emulsification of the fluid and suspended solids and colloidal structures contained therein. Process function 104 can begin as the fluid leaves HPU 22 and enters VVU 24. During process function 104, the accelerated fluid can undergo a rapid change in direction caused by VVU 24 and become mechanically sheared fluid. Process function 106 can begin once the mechanically sheared fluid leaves VVU 24 and enters RCFU 34. During process function 106, compressed gas and/or the coagulation/clarifying agent can be injected into the fluid via gas tube 26 and openings 30 and RCFU 34 can cause clays and associated colloidal structures contained within the fluid to be coalesced. Process function 108 can begin in FVU 36 where the fluid can be configured into a vortex and vorticose separation of the fluid can occur. During process function 108, the vorticose separation can cause the solids component of the fluid (the portion of the fluid containing suspended solids and particles) to migrate toward the outside of the spinning fluid vortex and the processed fluids component of the fluid (the portion of the fluid not containing suspended solids and particles) to migrate toward the interior of the spinning fluid vortex. During process function 110, the solids component of the fluid is extracted from FVU 36 via extraction fluid outlets 16 located in FVU 36. The fluid can continue to recirculate to HPU 22 via by-pass orifice 58 and repeat process functions 102-110 until the desired amount of suspended solids and particles are removed during process function 110 occurring within FVU 36. This desired amount can be determined based on the density of the recirculating fluid because the density of the recirculating fluid decreases as more suspended solids and particles are removed. Finally, at process step 112, the processed fluid component can be removed from device 10.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A method, comprising:
   flowing an aqueous fluid containing suspended solids into a hydrocyclone using a tangential inlet;
   removing a portion of the suspended solids in the hydrocyclone to form a hydrocyclone exit fluid;
   forming a rotating emulsion from the hydrocyclone exit fluid in the hydrocyclone;
   reversing flow direction of the rotating emulsion at the hydrocyclone exit;
   routing the rotating emulsion into a spiral auger separator;
   injecting gas into the rotating emulsion as the rotating emulsion enters the spiral auger separator to form a liquid-gas mixture;
   injecting a flocculation agent into the rotating emulsion with the gas;
   forming the liquid-gas mixture into a vortex;
   extracting a solids component of the vortex; and
   recirculating a processed fluid component of the vortex to the hydrocyclone.

2. The method of claim 1, wherein the reversing flow direction of the rotating emulsion at the hydrocyclone exit comprises flowing the rotating emulsion through a volute having adjustable geometry.

3. The method of claim 2, wherein the injecting gas into the rotating emulsion is performed as the rotating emulsion exits the volute.

4. The method of claim 1, wherein the extracting a solids component of the vortex comprises improving extraction efficiency by adjusting a flow rate to define a cut point.

5. The method of claim 4, wherein the reversing flow direction of the rotating emulsion at the hydrocyclone exit comprises flowing the rotating emulsion through a volute having adjustable geometry, and adjusting the geometry of the volute.

6. The method of claim 1, wherein the extracting a solids component of the vortex comprises withdrawing a fluid stream from the vortex in a direction tangential to a rotation of the vortex.

7. The method of claim 1, wherein the vortex is formed in a domed vessel connected to the hydrocyclone, and the recirculating a processed fluid component of the vortex to the hydrocyclone comprises adjusting a by-pass orifice of the domed vessel.

8. The method of claim 1, wherein reversing flow direction of the rotating emulsion at the hydrocyclone exit comprises flowing the rotating emulsion through a volute and varying a flow distance through the volute by adjusting a contour of the volute in relation to a density of the rotating emulsion.

9. The method of claim 1, wherein the reversing flow direction of the rotating emulsion at the hydrocyclone exit comprises flowing the rotating emulsion through a volute having an adjustable contour and adjusting the adjustable contour in relation to an amount of the solids component extracted from the vortex.

10. A method, comprising:
flowing an aqueous fluid containing suspended solids into a hydrocyclone using a tangential inlet;
removing a portion of the suspended solids in the hydrocyclone to form a hydrocyclone exit fluid;
forming a rotating emulsion from the hydrocyclone exit fluid in the hydrocyclone;
reversing flow direction of the rotating emulsion at the hydrocyclone exit;
routing the rotating emulsion into a spiral auger separator;
injecting gas into the rotating emulsion as the rotating emulsion enters the spiral auger separator to form a liquid-gas mixture;
injecting a flocculation agent into the rotating emulsion with the gas;
forming the liquid-gas mixture into a vortex having rotation along two perpendicular axes;
extracting a solids component of the vortex; and
recirculating a processed fluid component of the vortex to the hydrocyclone.

11. The method of claim 10, wherein the reversing flow direction of the rotating emulsion at the hydrocyclone exit comprises flowing the rotating emulsion through a volute having adjustable geometry.

12. The method of claim 11, wherein the injecting gas into the rotating emulsion is performed as the rotating emulsion exits the volute.

13. The method of claim 12, wherein the reversing flow direction of the rotating emulsion at the hydrocyclone exit comprises flowing the rotating emulsion through a volute having adjustable geometry, and adjusting the geometry of the volute.

14. The method of claim 13, wherein the extracting a solids component of the vortex comprises withdrawing a fluid stream from the vortex in a direction tangential to a rotation of the vortex.

15. The method of claim 14, wherein the vortex is formed in a domed vessel connected to the hydrocyclone, and the recirculating a processed fluid component of the vortex to the hydrocyclone comprises adjusting a by-pass orifice of the domed vessel.

16. The method of claim 14, wherein the vortex is formed in a domed vessel connected to the hydrocyclone, and the recirculating a processed fluid component of the vortex to the hydrocyclone comprises adjusting a flow rate of the extraction flow rate.

17. A method, comprising:
flowing an aqueous fluid containing suspended solids into a hydrocyclone using a tangential inlet;
removing a portion of the suspended solids in the hydrocyclone to form a hydrocyclone exit fluid;
forming a rotating emulsion from the hydrocyclone exit fluid in the hydrocyclone;
reversing flow direction of the rotating emulsion at the hydrocyclone exit by flowing the rotating emulsion through an adjustable volute;
routing the rotating emulsion from the adjustable volute into a spiral auger separator;
injecting gas into the spiral auger separator as the rotating emulsion exits the adjustable volute to form a liquid-gas mixture;
flowing the liquid-gas mixture from the spiral auger separator into a domed chamber having extraction outlets positioned at fixed locations and oriented tangential to vortex rotation directions and a by-pass orifice providing a recycle pathway to the hydrocyclone;
extracting a solids component of the vortex through the extraction outlets; and
recirculating a processed fluid component of the vortex to the hydrocyclone through the bypass orifice.

18. The method of claim 17, further comprising adjusting a geometry of the adjustable volute in relation to the extraction flow rate.

19. The method of claim 17, further comprising injecting a flocculation agent into the spiral auger separator.

20. The method of claim 17, wherein the routing the rotating emulsion from the adjustable volute into a spiral auger separator comprises passing the rotating emulsion through a widening entrance to the spiral auger separator.

* * * * *